United States Patent [19]

Le Nevez

[11] 4,269,508

[45] May 26, 1981

[54] DEVICE FOR ADJUSTING THE AZIMUTHAL AND INCLINATION DIRECTIONS OF A WAVE REFLECTOR

[75] Inventor: Yves F. Le Nevéz, Cachan, France

[73] Assignee: Societe Anonyme de Telecommunications, Paris, France

[21] Appl. No.: 58,780

[22] Filed: Jul. 19, 1979

[30] Foreign Application Priority Data

Jul. 19, 1978 [FR] France ............................... 78 21452

[51] Int. Cl.³ ............................................... G01C 1/02

[52] U.S. Cl. .................................... 356/249; 356/147

[58] Field of Search ............... 356/140, 147, 153, 245, 356/248, 249

[56] References Cited

U.S. PATENT DOCUMENTS 1,852,166 4/1932 Kaster ................................. 356/147

FOREIGN PATENT DOCUMENTS 2674 of 1863 United Kingdom ..................... 356/249

*Primary Examiner*—John K. Corbin

*Assistant Examiner*—Matthew W. Koren

*Attorney, Agent, or Firm*—Stevens, Davis, Miller & Mosher

[57] ABSTRACT

A device for adjusting the azimuthal and inclination directions of a wave reflector, notably for Hertzian waves, comprises a base plate adapted to be secured to a reference surface of the reflector, a cradle rigid with the plate and supporting a pivoting element movable in the adjustment inclination plane through an angle readable in relation to the cradle. This movable inclination element supports another element rotatably mounted about an axis perpendicular to the inclination pivoting axis, and constituting an element movable in the azimuthal direction through an angle readable in relation to the inclination movable element. The azimuthal movable element supports a sighting telescope movable in the inclination direction, the inclination and azimuthal movable assembly carrying an air-level whereby the reflector can be brought to the displayed inclination value by locking the air bubble, and the verticality of the azimuthal pivot axis can be obtained by adjusting the fastening of the base plate to the reflector.

2 Claims, 3 Drawing Figures

DEVICE FOR ADJUSTING THE AZIMUTHAL AND INCLINATION DIRECTIONS OF A WAVE REFLECTOR

The invention relates to the adjustment of wave reflectors, such as those used for Hertzian bonds or communications, of the remote field passive type.

A passive reflector is referred to as a "remote field" one when its distance to one or the other aerial of the Hertzian bond is at least equal to 2 $D^2/\lambda$, wherein D is the diameter or vertical dimension of the largest aperture, aerial or passive.

The remote field passive reflector is used when there is no optical visibility between the two active ends or stations to be connected by the radio bond, and wherein the bond balance is such that a reflector of relatively moderate size is capable of providing a sufficient margin and therefore a satisfactory bond quality.

In hilly or mountainous places, a passive reflector is used for clearing ridges or peaks separating two points mostly relatively close to each other in a horizontal plane. In this case, the use of a passive reflector is advantageous for it is maintenance free and more particularly it saves the construction of a station with active relay means in hardly accessible places.

In flat open country passive reflectors are frequently used for obtaining a direct access to the telephone exchange in a town when the exchange is not directly visible from the other end of the Hertzian bond. This arrangement is also economical since it permits of avoiding the construction of a Hertzian terminal station and the conveying of the received signals by cable to the telephone exchange.

A passive reflector generally consists of a flat metal distortion-free panel (generally of light alloy combining light weight with a good conduction and preserving its inalterability with time) secured to an iron framework tower with the interposition of support means permitting an adjustment about two pivot axes disposed at right angles to each other, i.e. one axe for obtaining the desired inclination and the other for obtaining the desired azimuth.

Thus, more particularly, the best possible efficiency is obtained by adjusting with precision the azimuth and inclination orientation of such passive reflector, and this constitutes a problem of which the hitherto proposed solutions proved to be particularly expensive and long to carry out.

A calculated predetermination of the inclination may be adequate for the adjustment, in contrast to a combined compass azimuthal adjustment which leaves room for trial and error search for the best efficiency, which in turn are time-robbing and require a manoeuvre crew.

Another proposition consists in utilizing aids in the form of costly infrared or laser tranceivers which are difficult to fix on towers, and besides the supply of electric power thereto is a constraint increasing with the transmitter-to-receiver distances.

The present invention is directed to provide a relatively economical device for advantageously accomplishing quickly and easily these azimuthal and inclination direction adjustments.

To this end, the device according to this invention for adjusting the azimuth and inclination direction of a wave reflector comprises essentially a base plate adapted to be fixed to a reference surface of the reflector, a cradle rigid with the plate and supporting a pivoting element movable in the vertical plane for the adjustment inclination through an angle readable in relation to the cradle, said azimuthal movable element supporting another element rotatably mounted about an axis perpendicular to the inclination pivot axis and constituting an element movable in the azimuthal direction through an angle readable in relation to an inclination movable element, said azimuth movable element supporting a sighting telescope movable for inclination, the inclination and azimuthal movable element assembly carrying an air-level whereby the reflector can be brought to the displayed inclination by locking the air bubble, and the verticality of the azimuthal pivot axis can be established by adjusting the fixing of the base plate on the reflector, in order to bring the reflector to the desired azimuth through the coincidence of the telescope sighting, under a given azimuth angle, with the direction of the wave transmitter or of the reflected wave receiver.

A typical form of embodiment of a device for adjusting the orientation of a wave reflector according to this invention will now be described by way of example with reference to the attached drawing.

Figure 1:
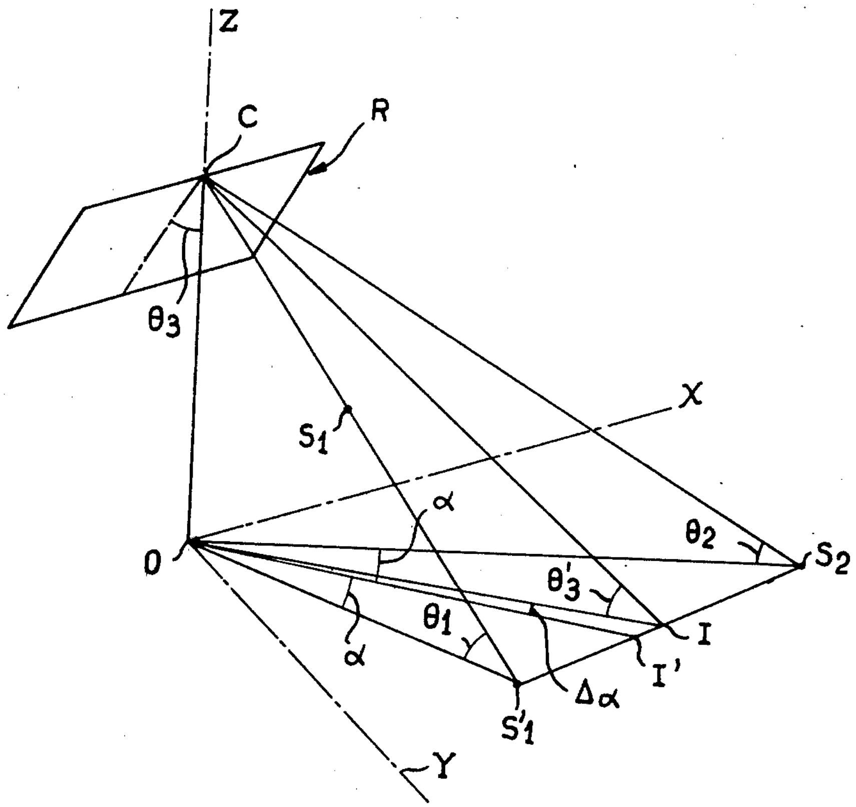
FIG. 1 is a diagram illustrating the parameters utilized for adjusting the position of a wave reflector between a transmitting station and a receiving station.

Referring first to the diagram of FIG. 1, the reference letter R designates, shown on a scale enlarged very considerably if compared with the other parts of the Figure, a reflecting panel intended for use as a passive relay between two stations denoted $S_1$ and $S_2$. The reference letter C designates a point on panel R corresponding to the location, on this panel, of the adjustment device of this invention, which is fixed to the panel surface. The letter O designates the projection of C in a horizontal plane which is the plane containing the x and y coordinates of the map of the site concerned, at an altitude Z assumed to be that of station $S_2$ ($S'_1$ being the point of intersection of $CS_1$ with the same plane) so that $\theta_1$ and $\theta_2$ will correspond to the inclination angles of elevation from which the reflector is seen from both stations $S_1$ and $S_2$. This reflector must be adjusted in the azimuthal direction at right angles to the bisectrix CI of angles $S_1CS_2$, and for inclination according to the angle $\theta_3$ equal to the angle $\theta'_3$ from which it would be seen from point I.

It will be seen that the projection OI of bisectrix CI onto the horizontal plane is not the bisectrix OI' of angle $S_2\theta S'_1$ equal to $2\alpha$ (which can be measured on the map or calculated) and makes therewith an angle $\Delta\alpha$. Calculating the inclination angle $\theta_3$ of the reflector and of $\Delta\alpha$ of which the purpose will be explained presently will give the following results:

$$tg\,\theta_3 = \frac{\cos\Delta\alpha}{\cos\alpha}\cdot\frac{\sin\theta_1+\sin\theta_2}{\cos\theta_1+\cos\theta_2}$$

$$tg\,\Delta\alpha = tg\,\alpha\,\frac{\cos\theta_1-\cos\theta_2}{\cos\theta_1+\cos\theta_2}$$

the signs giving the direction of $\Delta$, and $\theta_1$ and $\theta_2$ being measurable or calculated from the topographic data of points C, $S_1$ and $S_2$.

Figure 3:
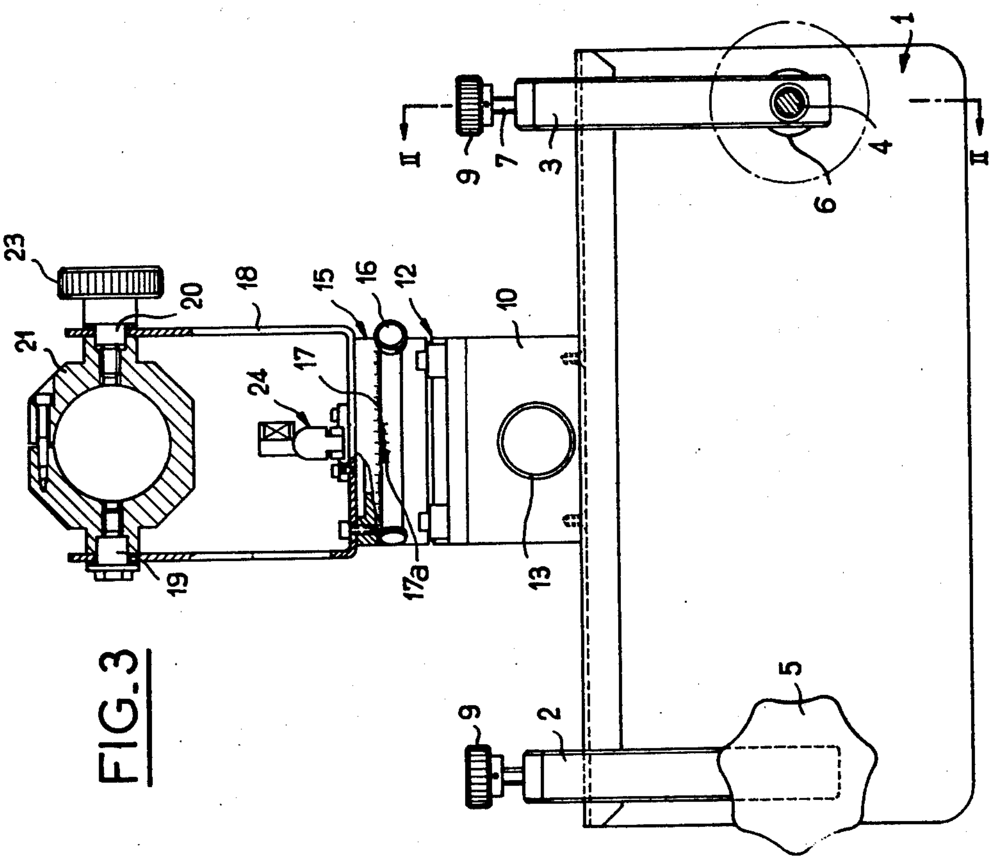
FIG. 3 is another elevational view taken in the direction of the arrow III—III of FIG. 2, with a fragmentary section taken along the line III—III.
Figure 2:
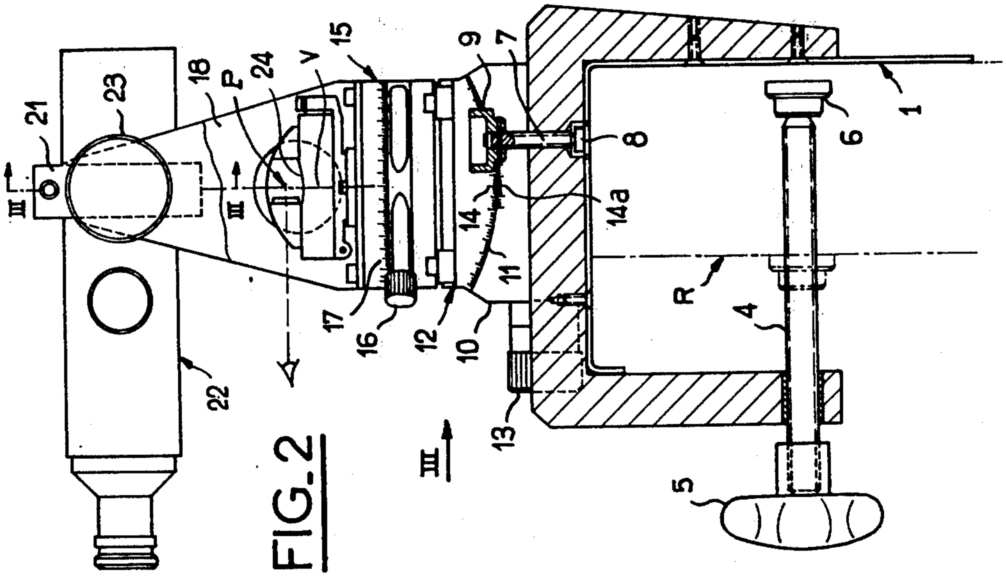
FIG. 2 is an elevational view, with a fragmentary section taken along the line II—II of FIG. 3, of the device of this invention.

The orientation adjustment device illustrated in FIGS. 2 and 3 comprises a base plate 1 having in cross-section the shape of an inverted L, to which a pair of spaced U-shaped clamps 2, 3 are secured by means of screws, the inner contour of these clamps matching that of the base plate. One arm of each clamp comprises a tapped hole receiving a screw rod 4 provided with a control knob 5 at its outer end and also with a tightening pad 6 at its inner end for fixing the base plate 1 in a position such that it straddles the top edge of the reflecting panel R, or a reference surface coplanar therewith.

The clamps 2 and 3 are also each provided, in the central or transverse portion of the U-shaped straddling element thereof, with a screw 7 also provided with a pad 8, which extends freely through the base plate 1 and carries a control knob 9 so that, as will be explained hereinafter, the horizontality of the device in the plane of the reflecting panel can be adjusted as necessary.

Fastened to the top surface of base plate 1 by means of screws is a cradle 10 pivotally supporting along the arc of the joint plane 11 (see FIG. 2) to which corresponds a virtual pivot axis P, an element 12 movable in the inclination plane of the adjustment contemplated, if we assume that the device is rigid with the reflecting panel. This element 12 is movable about the virtual axis P by actuating a knob-type manual control 13 driving a conventional mechanism (not shown) of the tangent screw type, rigid with said control knob, trunnioned in the cradle 10 and cooperating at the same time with a tangent wheel centered to said axis P, said wheel being rigid with said element 12. The angular position of this element 12 in relation to the cradle 10 can be read by means of a scale such as 14 carried by one of the elements 10 or 12, the other elements being provided with a matching vernier **14*a***.

As an alternative, finer graduation lines may be contemplated for this scale on the fixed bearing of the aforesaid tangent screw, this scale registering with the adjacent edge of knob 13 provided with a reading index line.

Rotatably mounted on the element 12 about an axis perpendicular to the inclination pivot axis P, as shown diagrammatically and geometrically in the form of an axis line V, is another element 15 constituting the azimuthal movable element of the device. This element 15 is movable about the virtual axis V by means of a knob-type manual control 16 driving a conventional mechanism (not shown) also of the tangent screw type, wherein the screw is rigid with said control knob and trunnioned in element 12 while engaging a tangent wheel contered on said axis V and rigid with element 15. The angular position of element 15 in relation to element 12 is readable by means of a peripheral scale such as 17 formed on one of said elements 12 or 15, the other element carrying a reading vernier **17*a*. Secured by screw means to element 15 is a stirrup-shaped member or bracket 18 having pivotally mounted by means of pivot member 19 and 20 between its upright lateral arms a collar 21 adapted to clamp a sighting telescope 22 movable for inclination between the arms of stirrup 18 and adapted to be controlled by means of a knob 23 rigid with said pivot member 20**.

Secured to the center of the flat transverse member or base of stirrup 18 is a precision air-level 24.

With the above-described device the adjustment of a reflecting panel may be accomplished as follows:

The base plate 1 is positioned on the top edge of the reflecting panel R so as to conform to the plane thereof with its depending wing, and before fixing this plate 1 in position by tightening the screws 4, the horizontality of the device in the plane of the reflecting panel R is obtained by rotating the movable element 15 to a position exactly at right angles with respect to the position of this element as shown in FIGS. 2 and 3, so as to bring the air-level 24 to a position parallel to the top edge of the panel, so that when the bubble is locked between its reference marks and the screws 7 carrying presser pads 8 are tightened, the desired horizontality is obtained, the element 15 being brought to a substantially vertical position for accomplishing this operation. Then the base plate 1 can be locked in position by means of the pads 6 carried by screws 4.

Having thus fastened the device on the reflecting panel, firstly the reflecting panel is adjusted for inclination by restoring the movable element 15 to the position shown in the drawing in relation to the perpendicularity of the air-level 24 with respect to the panel plane, which in this case may correspond to the zero line of the azimuthal scale 17 readable on the corresponding veriner **17*a*. Then, by displaying with precision the previously calculated inclination $\theta_3$, by means of the manual knob control 13 and the inclination scale 14 associated with a reading vernier 14*a*, it is clear that when the panel R is moved to adjust its inclination by means of its supporting members so as to lock the air bubble 24** between its reference marks, the exact inclination angle displayed on the inclination scale will be obtained.

Then the azimuthal adjustment is made, and in connection therewith it may be pointed out that the preceding operations controlled by means of the air-level 24 have been effective for imparting the necessary verticality to the axis V of element 15 movable in the azimuthal direction, so that it is now possible to measure by azimuthal sighting or lining-up, by means of the telescope 22 movable in the inclination direction, the real angle 2, made by the azimuths $CS_1$ and $CS_2$ of the aerials of stations $S_1$ and $S_2$, respectively, which can also be determined on the map of the site with a precision sufficient to permit the preliminary calculation of the aforesaid correction angle $\Delta\alpha$.

From the value of $\alpha$ resulting from the sightings made with respect to the aerials of stations $S_1$ and $S_2$, to which it is necessary to add or substract the angle $\Delta\alpha$ according as the adjustment sighting will be made with respect to the aerial of station $S_1$ or to that of station $S_2$, and by displaying the angle $\alpha\pm\Delta\alpha$ by means of the manual control knob 16 and of the azimuthal scale 17 of element 15, it is obvious that it is only necessary then to move the reflecting panel R by acting upon its supporting means so that the optical axis of sight of telescope 22 can be brought in alignment with the aerial of the selected station $S_1$ or $S_2$, so that the reflecting panel is actually oriented in the desired azimuth which is that of the straight line OI of FIG. 1.

Reiterations may be contemplated in both inclination and azimuth orientations for improving the fineness of the adjustment that can be obtained with the device of this invention, more simply and rapidly than with hitherto known methods.

The field of application of this optical device is broad enough to permit its use in current Hertzian bonds, and by way of illustration it may be noted that with a $\times 30$ magnification sighting telescope it is possible to make sightings to distances as great as 30 km, and up to 60 km if a flashing mirror is installed on the aerial of the station or stations contemplated.

Of course, many modifications and changes may be brought to the specific forms of embodiment shown, described and suggested herein, without departing from the basic principles of the invention as set forth in the appended claims.

What is claimed as new is:

1. A device for adjusting the azimuthal and inclination directions of a wave reflector, notably for Hertzian bonds, which comprises a base plate adapted to be fastened to a reference surface of the reflector, a cradle rigid with said base plate and supporting a pivoting element movable in the plane of the adjustment inclination through an angle readable in relation to said cradle, said inclination movable element supporting an element rotatably mounted about an axis perpendicular to the inclination pivot axis, and constituting a movable azimuthal element movable through an angle readable in relation to said inclination movable element, said azimuthal movable element supporting a sighting telescope movable for inclination, the inclination and azimuth movable assembly carrying an air-level whereby the reflector can be brought to the displayed inclination value by locking the air bubble, and also such that the verticality of the azimuthal pivot axis can be obtained by adjusting the base plate fastening to the reflector in order to bring the reflector to the desired azimuth by causing the telescope sighting, under a predetermined azimuthal angle, to coincide with the direction of the wave transmitter or with the direction of the receiver of reflected waves.

2. Device for adjusting the azimuthal and inclination directions of a wave reflector as claimed in claim 1, wherein said base plate is rigid with a pair of fastening clamps disposed straddlewise on the top edge of said reference surface of the reflector and comprising each an adjustment screw engaging said top edge in order to set the horizontality of the device in the reference plane of the reflector.

* * * * *